Figure 10:
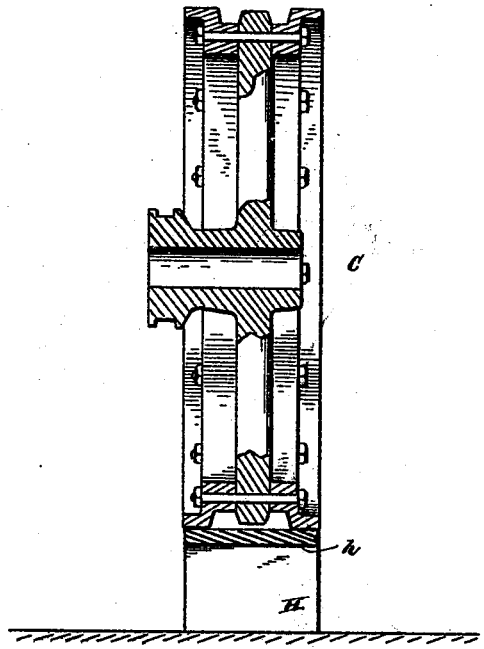

(No Model.) 3 Sheets—Sheet 1.
W. McCLOSKEY.
HARVESTER.
No. 517,655. Patented Apr. 3, 1894.
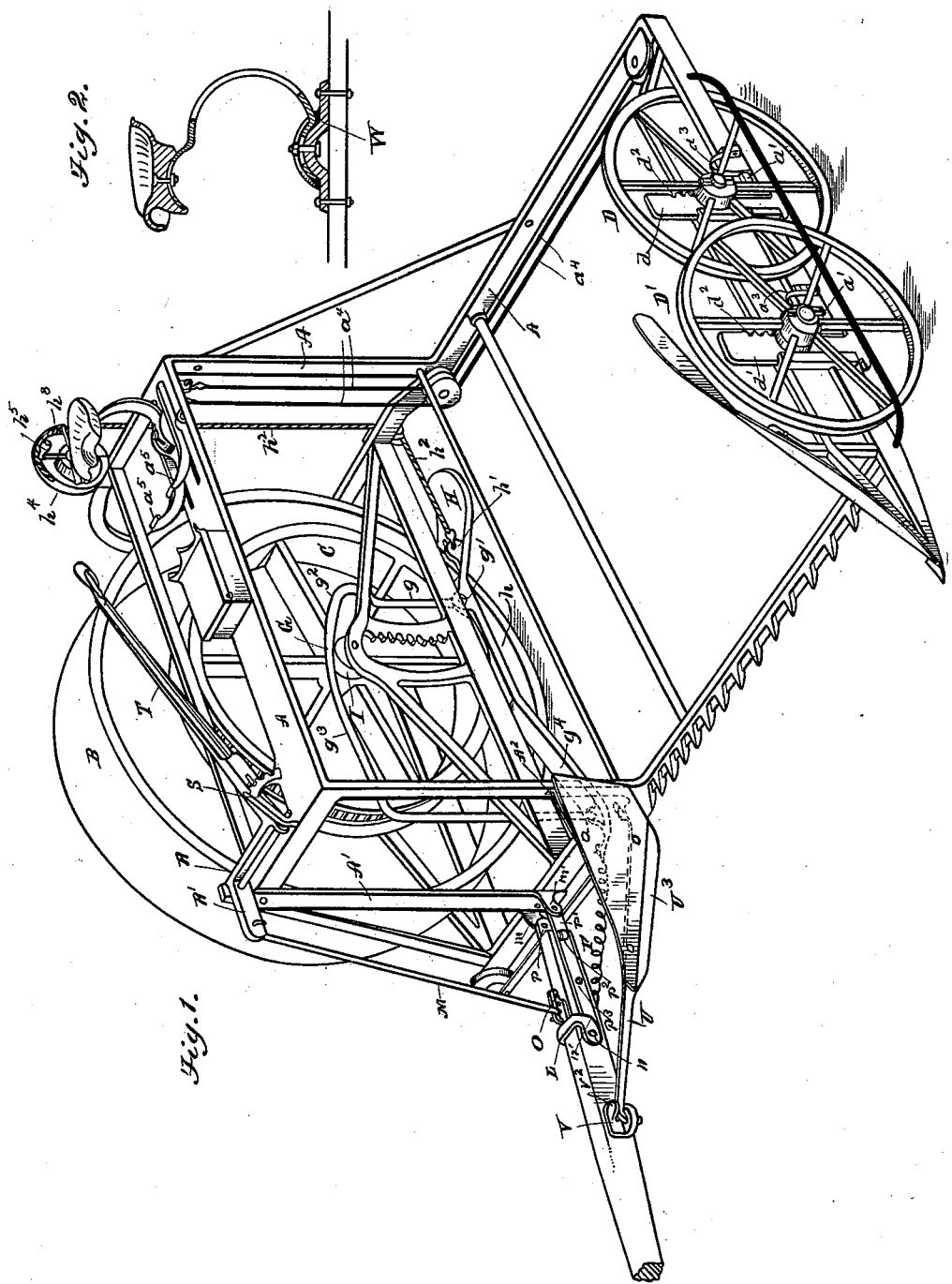
WITNESSES
F. Clough.
D. W. Bradford.
INVENTOR
William McCloskey
by Parker & Burton
Attorneys.

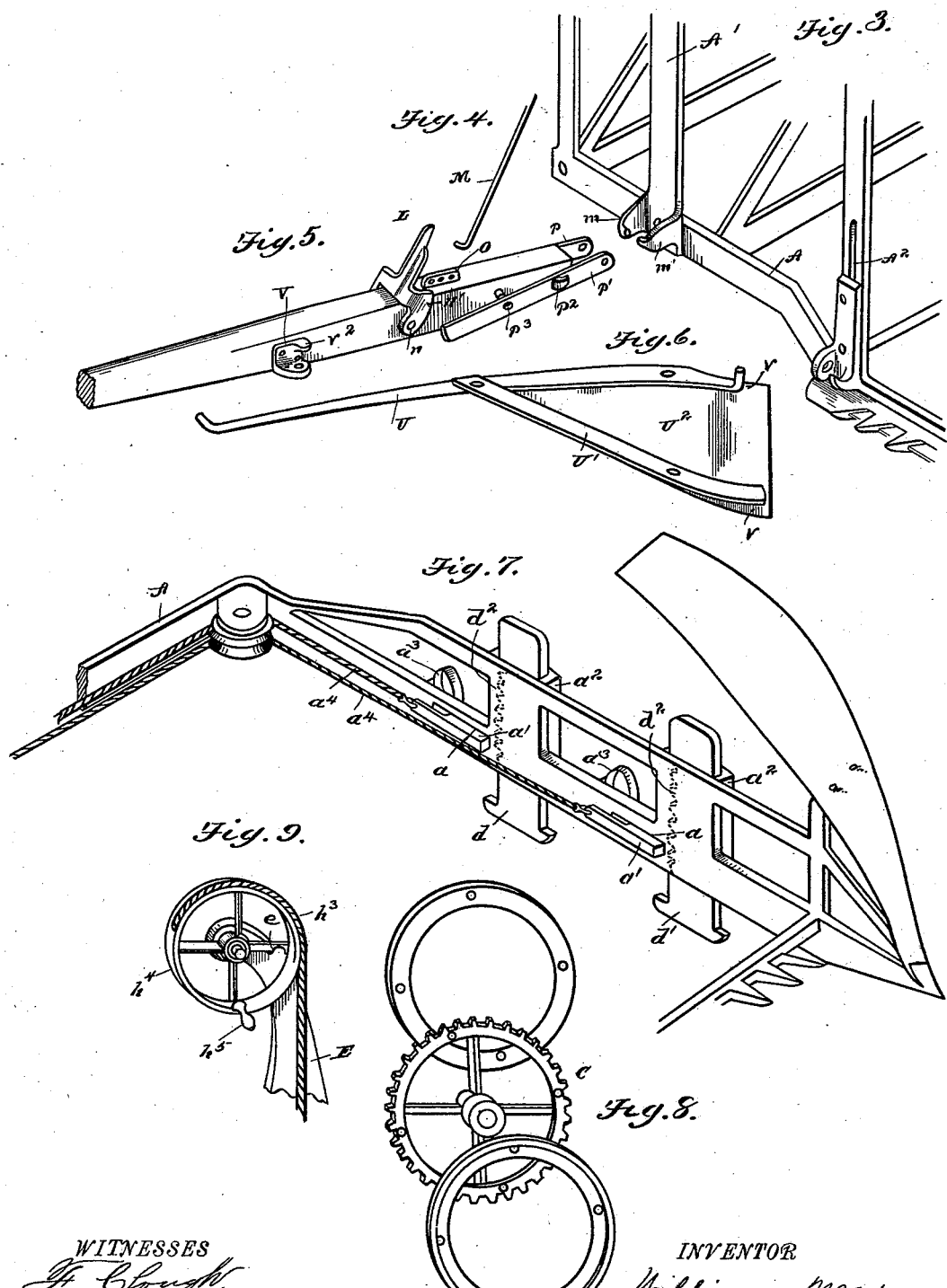

(No Model.) 3 Sheets—Sheet 3.

W. McCLOSKEY.
HARVESTER.

No. 517,655. Patented Apr. 3, 1894.

WITNESSES
D. W. Bradford
F. Clough

INVENTOR
William McCloskey
By Parker W Burton
Attorneys.

UNITED STATES PATENT OFFICE.

WILLIAM McCLOSKEY, OF ESSEX, CANADA, ASSIGNOR OF ONE-HALF TO ALEM J. GREEN, OF SAME PLACE.

HARVESTER.

SPECIFICATION forming part of Letters Patent No. 517,655, dated April 3, 1894.

Application filed June 12, 1893. Serial No. 477,285. (No model.)

*To all whom it may concern:*

Be it known that I, WILLIAM McCLOSKEY, a subject of the Queen of Great Britain, residing at Essex, county of Essex, Province of Ontario, Canada, have invented a certain new and useful Improvement in Harvesters; and I declare the following to be a full, clear, and exact description of the invention, such as will enable others skilled in the art to which it pertains to make and use the same, reference being had to the accompanying drawings, which form a part of this specification.

My invention relates to harvesters, and consists in improvements, as hereinafter described, upon the machine described in an application heretofore filed by me on the 31st day of January, 1893, Serial No. 460,380, all of which is hereinafter specified and claimed.

In the drawings, Figure 1 is a perspective view of a harvester embodying my improvements. Fig. 2 illustrates the improvements as applied to the seat. Figs. 3, 4, 5 and 6 illustrate my improvements as applied to the means for attaching and detaching the pole. Fig. 7 illustrates the means for adjusting the relative position perpendicularly of the two outer carrying wheels of the platform. Fig. 8 illustrates an improvement in constructing the sprocket wheel driving the cutter mechanism. Fig. 9 is a detailed figure illustrating the manner of operating the devices for adjusting the carrying wheels. Fig. 10 is a perpendicular sectional view of the sprocket wheel and bridge upon which it rotates in crossing a dead furrow as hereinafter described.

Similar letters refer to similar parts.

In the drawings, A represents the main frame of a harvester. B represents the drive wheel. C represents a sprocket wheel rigidly attached to the axis of the drive wheel and compelled to rotate with it. D, D', represent carrying wheels for the outer end of the frame and platform. H represents a shoe raised in the center at $h$, and adapted to form a tread for the sprocket or band wheel C. Each of these are common to the mechanism of my former application, and will not need a detailed description.

As described in my former application, the shoe H has a frame arising from it, marked G, which passes over the hub I of the band wheel. The rear portion of the frame at $g$ is pivoted to the rear portion of the tread of the shoe at $g'$. It rises therefrom, and, being curved backward to fit the hub of the wheel when the shoe is drawn to its greatest distance forward, it then curves forward at $g^2$ a short distance, then descends a few inches at an angle at $g^3$, then turns downward, and is attached to the extreme forward end of the shoe $g^4$. Attached to the rear portion of the shoe at $h'$ is a cord or chain $h^2$; this, passing over any appropriate pulley at the rear portion of the frame, arises to a position near the driver at $h^3$, substantially as shown in my former application, filed January 31, 1893, Serial No. 460,380, and is there preferably attached to and wound upon a wheel or drum $h^4$. This drum is shown in detail in Fig. 9. It consists of a wheel with a wide face, and having several spokes connecting the rim to the hub in the usual form. On the rim is attached a handle $h^5$, by which it may be rotated. It is journaled upon a journal attached to a bracket E, arising from the frame to which it is firmly attached. This bracket has a projecting lug $e$. The drum has sufficient longitudinal motion upon its bearing so as to permit of the spokes being engaged or disengaged at will from the lug, and thus permitting the rope or chain to be wound upon it to any desired extent, and held in any position that may be desired, with one of the spokes engaged in the lug. To the forward end of the shoe is attached a coil spring F. This projects forward and is attached to a lug on the under side of the pole. The position of this spring is shown in Fig. 1. The office of this spring is to hold the shoe drawn to the limit of its motion toward the front of the machine, so that as the main or driving wheel descends in a dead furrow, the two ends of the shoe will come in contact with the banks, and the sprocket wheel will then come in contact with the tread of the central portion of the shoe which becomes stationary; the sprocket wheel rotates thereon until the driving wheel comes in contact with the opposite bank. During this process, the spring F is stretched to the extent of the forward motion of the machine. As the driving wheel is raised upon the bank, the sprocket wheel is released from the tread, and the spring will draw the shoe forward to its original position. During this operation the cord or chain $h^2$ may be left to hang loosely. If desired, however, to withdraw the shoe entirely from the ground so that it may not come in contact therewith in case of the wheel descending in a dead furrow or otherwise, the cord or chain $h^2$ is wound upon the drum by the driver, thus drawing the shoe against the tension of the spring to the rear, and at the same time raising it by virtue of the angularity of the forward portion $g^3$ of the frame H. It may be fastened in this position by locking one of the spokes of the wheel $h^4$ over the lug $e$ projecting from the bracket E. Upon unlocking the wheel and letting go of it, the spring F will at once draw the shoe forward to its position, where it is adapted to engage and support the sprocket wheel when the driving wheel descends into a dead furrow.

It is obvious that the outer carrying wheels D and D' will not at all times remain in proper relation to the ground, as the front or cutting edge of the platform is raised and lowered therefrom. As it is requisite in machines of this character to tilt the platform, thereby dropping the cutting edge below the rear thereof; in such case, if the axles of the wheels were arranged in a plane parallel with that of the platform, it is obvious that the front wheel would rest upon the ground, and the rear wheel would be elevated therefrom a distance proportionately to the tilting, when the jolting of the platform would be proportional to the depth of the furrow and the distance that the rear wheel was elevated from the ground. In order to furnish a ready means of adjusting the relative heights of the wheels, I have devised the mechanism shown in Figs. 1 and 7, whereby the driver can at once make such an adjustment without leaving his seat. For this purpose, there are located in slits $a$ $a$, cut in the main frame A, two bolts $a'$ $a'$. These bolts have a longitudinal motion in the slit, somewhat more than the depth of notches in standards carrying the wheels, as hereinafter described.

The bearings of the wheels D and D' extend from standards $d$ $d'$, which are adapted to slide in bearings $a^2$ $a^2$ formed in the main frame, and by means of which the height of a wheel is adjusted by reference to the platform and the frame. When so adjusted, they are held in position by the bolts $a'$ $a'$ engaging in notches $d^2$ $d^2$ upon the rear side of the standards. The bolts $a'$ $a'$ are forced up into the engaging position by springs $a^3$ $a^3$. In case, therefore, the forward wheel D' is carrying the weight of the platform, and the rear wheel D is a few inches from the ground and is held up by virtue of its appropriate bolt $a'$ engaging in the notch in the rear of the standard, it is obvious that, by withdrawing the bolt from the notch, the standard carrying the wheel will drop until the wheel comes in contact with the ground. Upon releasing the bolt, the spring will force it into engagement with its appropriate notch in the standard, and thus hold it in that position, thereby approximately leveling the bearing with reference to the ground on the two wheels, and bringing the weight of the platform upon them both. Small differences may be neglected, as of course an adjustment can only be for approximately level ground.

In order to place the bolts under the control of the operator, there is attached to the rear of each of the two bolts $a'$ $a'$, two cords or chains $a^4$ $a^4$, which pass to the rear angle of the frame A, as more particularly shown in Fig. 7; and thence over sheaves fixed in the angle, and passing along the rear bar of the frame A, as shown in Fig. 1, to a position directly under the driver's seat. There the direction of the cords is changed by passing through appropriate pulleys, and they are brought up underneath the driver's seat, and attached to the rear end of two foot rocking levers $a^5$ $a^5$. These foot levers are pivoted so that their outer ends may be depressed by the driver's feet at will. It is obvious that by proper adjustment the depression of one of the levers will withdraw the bolt to which it is connected, and permit the standard which engages with such bolt to drop with its wheel, until the wheel comes in contact with the ground. In case the rear wheel becomes the carrying wheel, and the forward wheel is elevated from the ground, the forward wheel can be dropped as hereinbefore stated, and as rocking mechanism is provided whereby the front of the platform may be alternately lifted and depressed; by combining the two actions, as, for instance, depressing the front of the platform, thus raising the rear wheel from the ground, the bearing coming upon the front wheel, and if in that position, the front wheel is dropped to the ground and locked, and then, if the platform is tilted back up to a level, and the front wheel thus lifted from the ground, and if this is also dropped, and then the front edge of the platform depressed, thereby lifting the rear portion of the platform, the rear wheel will again be lifted from the ground. Thus, it will be seen that the platform may be raised and lowered by successive stages or steps, by combining the two actions, and this, without the driver's leaving his seat.

Figs. 1, 3, 4, 5 and 6 illustrate my improved means of attaching and detaching the pole, and for tilting the platform. To the frame A is attached a bracket A', having two internal curved points or horns, $m$ $m$. These points are located so that they are a suitable distance apart. Upon one side of the pole P is rigidly attached a strip of metal, $p$, having at its rearward end an eye. Upon the opposite side of the pole is pivotally attached a similar strip of metal $p'$, the pivot being at $p^2$. This strip $p'$ has also an eye at its outer end. The eyes in the strips $p$ and $p'$ are adapted to engage in the two projections or horns of the bracket hereinbefore described. The strip $p'$ is perforated at $p^3$, where it engages a lug extending from the pole so that, when the strip is brought closely in contact with the pole, it is incapable of the vertical movement. It is obvious that, by swinging the front end of the strip $p'$ outwardly, the rearward ends of the two strips containing the eyes are brought closely together. This enables them to pass between the horns of the bracket, and, the horns being engaged with the eyes of the two strips respectively, the swinging of the strip $p'$ into contact with the pole, and upon the lug hereinbefore mentioned, connects the pole with the horns pivotally, but, so long as the strip $p'$ is held in the position described, prevents its being detached therefrom. In order to hold it in this position, I have devised a latch L, pivotally attached to the pole at $n$. One side of this latch, the side not shown in Figs. 1 and 5, is simply pivoted to a bolt passing through the pole. The opposite side is also pivoted by means of an eye at its extremity engaging with the bolt, but is pivoted at a sufficient distance from the pole so as to permit the rearward projection thereof, $n'$, to pass over and outside of the strip $p'$ when the strip is in contact with the pole. So long, therefore, as the latch is depressed, as shown in Fig. 1, with the strip $p'$ in position, the strip cannot be swung outward from the pole, and hence the parts described are locked in the connecting position.

The tilting mechanism consists of a rod M, one end of which is adjustably attached to a strip of angle iron, rigidly fastened to the top of a pole, and marked O; the rod M having its lower end made in the form of an angle and rounded, adapted to engage in holes in the angle iron, so that its position with reference to the pole may be adjusted. The hand piece of the latch hereinbefore described is so adjusted with reference to the bracket, that there is just sufficient distance, when the latch is swung down in position as shown in Fig. 1, between the hand piece and the bracket to accommodate the thickness of the rod M. Hence, when the rod is hooked into the bracket, and the latch swung into position, as shown in Fig. 1, the rod M is prevented from disengaging, and thus it is pivotally attached to the pole. The upper end of the rod M is connected to an arm R' of a rock shaft R, which is journaled in appropriate bearings at the upper forward end of the frame, as shown in Fig. 1. Projecting from the main frame is a quadrant S of the usual form and construction, and to the rock shaft is rigidly attached a hand lever T, carrying the usual latch mechanism for engaging in the quadrant. It is obvious that, by swinging this lever T into different positions and locking it therein, the front end of the platform may be tilted with reference to the angle which the pole makes therewith, and that, if the outer end of the pole be rigidly held at a certain distance from the ground, the platform must be tilted with respect to the ground by means of the mechanism described.

As a side brace for the pole, and also serving as a fender and guard, I have devised the mechanism shown in Figs. 1, 3, 5 and 6. This is made up of a curved bar U, shown more particularly in Fig. 6. Near the center thereof is attached at an angle a bar U', and to both is firmly riveted a piece of sheet iron $U^2$. This iron is triangular in form, with the lower rearward angle cut away, and from front to rear is somewhat curved in shape. At the two points $v\ v$, it springs away from the bars U U', more especially as shown in Fig. 6. The bar U has formed at its rearward and lower end a hook projecting transversely, Fig. 6 being a perspective of the same in a horizontal plane. The bar U' projects from the point of contact with the piece of sheet iron in a somewhat curved shape, there being a space between it and the sheet iron at its outer end. The outer end of the bar U is turned at right angles, and formed into a hook, which, when in position, projects downwardly. To the side of the pole is fastened a bracket V. The lower edge of this bracket is formed into a lug having an eye therein, into which the outer end of the bar U may be hooked, as hereinafter described. The upper end of the bracket, and at its rear side, is formed into another lug $v^2$, which does not project to quite the extent of the bracket with the eye, so that the bar U, when inserted in the lower lug and then swung backward into position, as shown in Fig. 1, is brought underneath the bracket $v^2$ in such a manner that it is prevented from being disengaged, as illustrated by Fig. 1. The rearward end of the bar U' engages in a slot in the lower portion of one of the standards of the frame A at $A^2$, the sheet iron fender projecting rearwardly outside of the frame, while the bar U' is in that position as illustrated in Fig. 1. The lower edge of the bar U has projecting outwardly from it, and in the direction of the grain, a plate, which thus presents an edge to the grain in the forward motion of the machine. This is illustrated in Fig. 1 at $U^3$. It is found that this edge of a plate forms a better fender and collects the heads of the grain in much better shape than a round bar or a mere flat sheet of metal brought facewise to the grain.

As it may be difficult at times to construct the sprocket wheel having a smooth tread and a depression in the center for the purpose of taking in the chain upon the sprockets, I have shown a device whereby the same can be made in three pieces, as shown in Fig. 8, they being formed of two smooth sections or rings, one of them having a recess into which one side of the sprocket wheel may be inserted, and the other being a smooth ring, and the whole fastened together by means of bolts, thus virtually forming two rings bolted to a sprocket wheel, with their faces raised beyond the projections of the sprockets.

In order to better accommodate the driver's position in a mechanism of this kind, I have devised certain improvements in the seat, and which are shown in section in Fig. 2 and illustrated in perspective in Fig. 1. Attached to the frame is a saddle W, having a raised circular portion shown in the figure; or a clip may be formed to pass over it, whereby it may be fastened firmly in the usual manner for such devices. This permits an adjustment upon the curve of the saddle, and thereby permits the seat to occupy a position relative to the frame, either nearer to or farther away from the foot levers and hand lever T hereinbefore described. As such adjustment, however, necessitates a tilting of the seat, which might in positions be uncomfortable, I have arranged a similar mechanism, except in reverse, whereby the position of the seat may be brought to a level. The seat rests upon a saddle, the under side of which is concave, and the spring upon which the saddle rests is formed to fit this concavity, and is made adjustable therein, so that in case the seat is thrown backward by means of the lower adjustment, it may be brought up to a level position by means of the upper adjustment. This co-operates with the tilting mechanism, as the seat thereby may be adjusted to a comfortable position regardless of the tilting frame and platform.

The operation of this device will be understood from the description; and a separate description thereof I do not deem to be necessary.

What I claim is—

1. In combination with the frame and platform of a harvester, two outer carrying wheels adapted to be raised and lowered with refererence to said frame, foot levers within the reach of the driver, and means connecting said foot levers with locking bolts, whereby said bolts may be operated to lock or unlock bearings carrying the wheels, substantially as described.

2. In a harvester, the combination of a main frame, two outer carrying wheels, means whereby said wheels may be made adjustable at the will of the driver with reference to the elevation of the platform, an adjustable tilting pole, and means within the reach of the driver whereby the adjustment of the tilting pole may be changed at will, substantially as described.

3. The combination with the main frame of a harvester, of means for tilting the platform thereof within reach of the driver, a double adjustable seat constructed with an adjustable bearing upon the under side of the seat, about which the seat may be rotated, an adjustable bearing upon the frame upon which the seat spring rests, and upon which the seat spring may also be rotated, and means for fastening the seat and the seat spring respectively in any desired position within the limits of the rotation, substantially as described.

4. A pole attachment for a harvester or analogous mechanisms, consisting of the combination of the main frame, brackets projecting from the forward end of the main frame at a suitable distance from each other, a fixed strap upon one side of the pole rigidly attached thereto and adapted to engage one of the brackets, a strap pivotally attached to the opposite side of said pole, one end of which is adapted to engage the opposite bracket, and the other end of which is adapted to be locked to the side of the pole in such manner that the straps are pivotally attached to the brackets and may be detached at will by a reversal of the operation of attachment, and means for locking the pivotal strap rigidly to the side of the pole, substantially as described.

5. In a pole attachment for a harvester or analogous mechanism, the combination of the main frame, brackets projecting from the forward end of the main frame at a suitable distance from each other, a fixed strap upon one side of the pole rigidly attached thereto and adapted to engage one of the brackets, a strap pivotally attached to the opposite side of said pole, one end of which is adapted to engage the opposite bracket, and the other end of which is adapted to be locked to the side of the pole in such manner that the straps are pivotally attached to the brackets and may be detached at will by a reversal of the operation of attachment, means for locking the pivotal strap rigidly to the side of the pole, and a side brace adapted to be locked to the pole and pivotally locked to the frame of the harvester, substantially as described.

6. A pole attachment for a harvester or analogous mechanisms, consisting of the combination of the main frame, brackets projecting from the forward end of the main frame at a suitable distance from each other, a fixed strap upon one side of the pole rigidly attached thereto and adapted to engage one of the brackets, a strap pivotally attached to the opposite side of said pole, one end of which is adapted to engage the opposite bracket, and the other end of which is adapted to be locked to the side of the pole in such manner that the straps are pivotally attached to the brackets and may be detached at will by a reversal of the operation of attachment, means for locking the pivotal strap rigidly to the side of the pole, a side brace adapted to be locked to the pole and pivotally locked to the frame of the harvester, a connecting rod connecting the pole to a rock shaft operated by a lever within reach of the driver, and a quadrant and latch for holding the lever in a predetermined position, substantially as described.

7. In a detachable pole mechanism for harvesters, the combination of a pole, a bracket containing an upper and a lower lug separated by a space, a side brace adapted to engage in an eye in the lower lug, and when in position being swung under the upper lug, the opposite end of the side brace being connected to a perpendicular lug upon the main frame having eye therein, a projection extending from near the center of said side brace upwardly and backwardly, the end of which is adapted to engage with the slot in the main frame, and a link connected to a hand lever with means of adjustment thereof and detachably connected to a bracket upon the upper side of said pole, whereby, when said pole is in position attached to the harvester and said link is connected, the upward extension from the side brace is compelled to pass through the slot in the frame and prevent the detachment of the side brace from the eye in the frame, substantially as and for the purpose described.

8. In a pole mechanism for harvesters, the combination of a pole, means for attaching and detaching the pole from the harvester, consisting of one fixed and one swinging strap adapted to engage in brackets on the harvester, a connecting rod connected to an adjusting mechanism and detachably pivotally connected with a bracket upon the upper side of the pole adjacent to the outer end of the swinging strap, and a swinging clasp latch adapted to hold a swinging strap to the side of the pole and simultaneously secure the rod in an eye in the bracket on the upper side of the pole, substantially as described.

9. A sprocket wheel, composed of three parts: first, a wheel having sprockets or teeth and attached by spokes to a hub; second, a side ring recessed upon one side and having a face of diameter equal to or greater than the periphery of the teeth of the sprocket wheel; and, third, an opposite companion ring, and bolts whereby the two rings may be secured upon either side of the sprocket wheel in combination with a bridge upon which said sprocket wheel is adapted to rotate, substantially as described.

In testimony whereof I sign this specification in the presence of two witnesses.

WILLIAM McCLOSKEY.

Witnesses:
R. A. PARKER,
MARION A. REEVE.